United States Patent
Langhanki et al.

(10) Patent No.: US 10,054,174 B2
(45) Date of Patent: Aug. 21, 2018

(54) REGULATING AN ACTUAL PRESSURE OF A MOTOR VEHICLE CLUTCH

(71) Applicant: GKN Automotive Ltd., Redditch, Worcestershire (GB)

(72) Inventors: Andreas Langhanki, Duisburg (DE); Khac Anh Phan, Sankt Augustin (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 15/527,030

(22) PCT Filed: Nov. 19, 2014

(86) PCT No.: PCT/EP2014/074959
§ 371 (c)(1),
(2) Date: May 16, 2017

(87) PCT Pub. No.: WO2016/078702
PCT Pub. Date: May 26, 2016

(65) Prior Publication Data
US 2017/0321768 A1    Nov. 9, 2017

(51) Int. Cl.
*F16D 48/06*  (2006.01)
*F16D 48/02*  (2006.01)
*F16D 25/0638*  (2006.01)

(52) U.S. Cl.
CPC ....... *F16D 48/066* (2013.01); *F16D 25/0638* (2013.01); *F16D 48/02* (2013.01);
(Continued)

(58) Field of Classification Search
CPC .... F16D 48/066; F16D 25/0638; F16D 48/02; F16D 2500/70406; F16D 2500/1045;
(Continued)

(56) References Cited

U.S. PATENT DOCUMENTS 6,341,552 B1 * 1/2002 Potter ................... F15B 19/002
91/433
6,419,067 B1 * 7/2002 Fischer ............... F16D 25/0638
192/109 F (Continued)

FOREIGN PATENT DOCUMENTS

DE   102006038446 A1   2/2008
DE   102011100836 A1   11/2012
(Continued)

OTHER PUBLICATIONS

International Search Report and Written Opinion for PCT/EP2014/074959 dated Aug. 3, 2015 (12 pages; with English translation).

*Primary Examiner* — David J Hlavka
(74) *Attorney, Agent, or Firm* — Bejin Bieneman PLC

(57) ABSTRACT

Actual pressure of a hydraulic clutch of a motor vehicle can be regulated by: a) providing a value for a desired pressure to be present in a clutch cylinder; b) filling the clutch cylinder with hydraulic fluid to achieve the desired pressure; c) wherein, if the desired pressure lies between 0 and 7 bar, the actual pressure in the clutch cylinder is adjusted by regulating a rotational speed of the pump of the electric motor, and if the desired pressure is greater than 7 bar, the actual pressure in the clutch cylinder is adjusted by regulating a motor current of the electric motor; d) regulating the actual pressure until the desired pressure is achieved.

6 Claims, 2 Drawing Sheets

Figure 1:
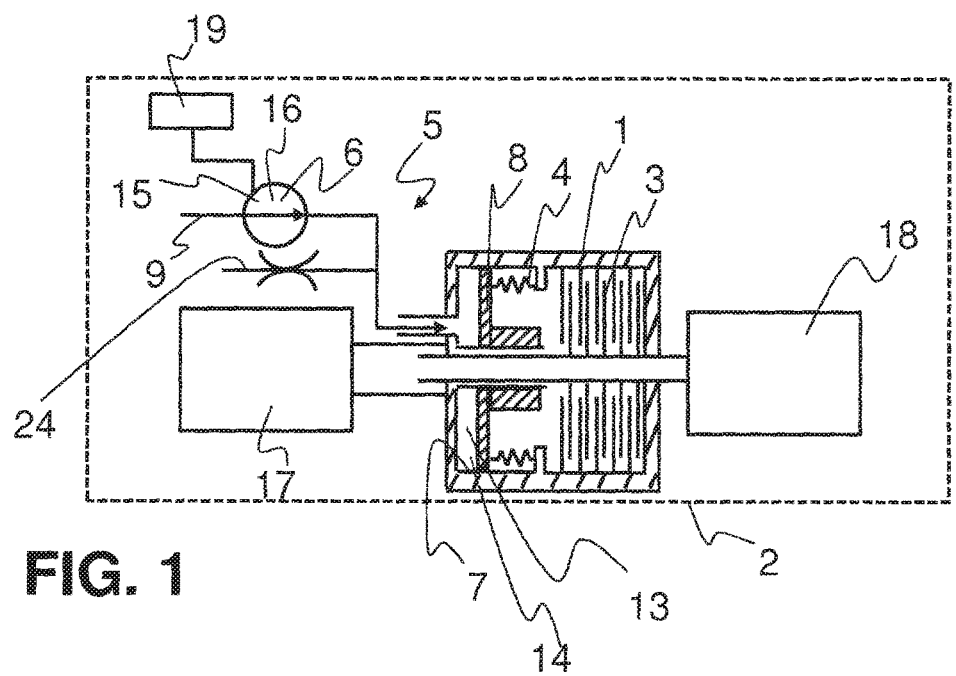

(52) U.S. Cl.
CPC ............ *F16D 2048/0233* (2013.01); *F16D 2500/1026* (2013.01); *F16D 2500/1045* (2013.01); *F16D 2500/10412* (2013.01); *F16D 2500/3024* (2013.01); *F16D 2500/70406* (2013.01)

(58) Field of Classification Search
CPC ... F16D 2500/10412; F16D 2048/0233; F16D 2500/1026; F16D 2500/3024
See application file for complete search history.

(56) References Cited

U.S. PATENT DOCUMENTS

| 2009/0125201 | A1* | 5/2009 | Leibbrandt | ............ | F16D 48/02 |
| | | | | | 701/67 |
| 2011/0278129 | A1* | 11/2011 | Gorius | ................ | F16D 48/066 |
| | | | | | 192/85.01 |
| 2014/0109999 | A1* | 4/2014 | Meissner | ............... | F16D 25/14 |
| | | | | | 137/565.11 |
| 2016/0363215 | A1* | 12/2016 | Kohler | ................ | B60K 6/387 |

FOREIGN PATENT DOCUMENTS

| DE | 102011089031 A1 | 6/2013 |
| EP | 2725252 A2 | 4/2014 |
| WO | 2006047806 A1 | 5/2006 |

* cited by examiner

REGULATING AN ACTUAL PRESSURE OF A MOTOR VEHICLE CLUTCH

CROSS-REFERENCE TO RELATED APPLICATIONS

This application is a national stage of, and claims priority to, Patent Cooperation Treaty Application No. PCT/EP2014/074959 filed on Nov. 19, 2014, which application is hereby incorporated herein by reference in its entirety.

The present disclosure relates to regulating an actual pressure in a (hydraulically actuable) clutch of a motor vehicle.

The method of this disclosure can be used, in particular, in the following electro-hydraulically actuated clutches:
- clutches in rear axle modules (for example, the clutch can be integrated on a side of the differential between the lateral shaft wheel and the lateral shaft);
- clutches in hang-on systems (in the drive train of a switchable axle);
- clutches in what are known as disconnect systems (for example, in angular gear mechanisms for switching off or shutting down the drive train which lies downstream of it);
- clutches in what are known as torque vectoring systems (for example, in the case of axles, in which the differential is replaced by two clutches for the left-hand and right-hand lateral shaft); and
- clutches in customary limited slip differential systems (for example, as a transverse lock in a rear axle differential);

The clutch under consideration here as a rule comprises a plurality of clutch linings and a clutch spring, and is connected to a hydraulic pressure system which has at least one pump, a clutch cylinder and a clutch piston. The hydraulic pressure system is suitable for delivering a hydraulic fluid into the clutch cylinder via the pump and for moving the clutch piston, with the result that the clutch linings are brought into contact with one another counter to a force of the clutch spring. An air gap is overcome at what is known as a grip point of the clutch, and the clutch linings are in contact with one another, the force of the clutch piston and the force of the clutch spring just canceling one another out, with the result that the clutch linings bear against one another without a pressing force or without a substantial pressing force. A further increase in the pressure in the pressure system then directly brings about a provision of a torque capacity of the clutch, that is to say the clutch would then transmit a torque, for example from a drive unit to a transmission.

In hydraulically actuated clutches, the operating pressures which prevail during operation have to be set or regulated as precisely as possible to best achieve rapid implementation of the currently required setpoint pressures and therefore comfortable operation of the clutch.

A method for determining a grip point (contact point in said document) of a clutch is known, for example, from DE 10 2011 089 031 A1. For improved operation of the clutch, it is proposed in said document to determine a grip point which is relevant on the control side and is at a defined spacing from an inflexion point (that is to say, the point, at which the transition takes place from an elastic clutch behavior to a rigid clutch behavior). As a result, the response behavior of the clutch is reduced considerably, and the pressure following behavior of the clutch is improved considerably.

Objectives for reducing the costs for clutches have led to internal considerations as to the extent to which indirect measuring methods can be used, for example by way of measurements of the motor current of an electric motor, which motor current is used for driving the pump of the hydraulic pressure system, in order to ensure exact regulation of the operation of the clutch, in particular while avoiding a use of additional sensors (for example, a pressure sensor) on the clutch. The required parameter of pressure might thus be determined by means of suitable methods and algorithms.

On this basis, intensive and comprehensive internal test bench tests have been carried out which have led to the finding that the correlation is very high between the pressure which is determined by means of indirect measuring methods and the actual pressure which is measured by means of pressure sensors, at relatively high pressures (setpoint pressure of from 7 to 40 bar). A high correlation was also able to be determined over a temperature range of −20° C. (degrees centigrade) to 100° C.

It has also been determined, however, that, at low setpoint pressures (below 7 bar), the correlation between the pressure which is determined by way of measurement of the motor current of the electric motor and the actual pressure which is measured by means of pressure sensors is insufficient at relatively low pressures. After very comprehensive analyses, a cause of this insufficient correlation has been identified as there not being a (sufficiently) proportional relation between the pressure and the motor current of the electric motor at low setpoint pressures. Disturbance variables, such as mechanical friction and/or hydraulic losses, then influence the behavior of the hydraulic pressure system significantly. Said behavior also deteriorates, above all, at cold temperatures (approximately −20° C.) and very high temperatures (approximately 100° C.).

A solution is presented herein to the problems depicted in relation to the prior art and the internally identified problems and, in particular, to propose a method, by way of which improved operation of an inexpensive clutch can be achieved by virtue of the fact that a more precise regulation of the pressure (higher correlation between the setpoint pressure and the regulated pressure) can be realized. This applies, in particular, to hydraulic pressure systems, and clutches, in which no direct measurement of the actual pressure by way of a pressure sensor takes place, but rather in which the actual pressure is determined by way of indirect measurement processes (for example, by way of measurement of the motor current of the electric motor which is used to drive the pump).

The disclosure includes the features of claim 1. Further advantageous embodiments are specified in the dependent claims. It is to be noted that the features which are described individually in the dependent claims can be combined with one another in any desired, technologically appropriate way, and define further embodiments. Moreover, the features which are specified in the claims are clarified and explained in greater detail in the description, further preferred embodiments being shown.

For this purpose, a method for regulating an actual pressure of a clutch of a motor vehicle is proposed. The clutch has a plurality of clutch linings and a clutch spring, and is connected to a hydraulic pressure system which has at least one pump, a clutch cylinder and a clutch piston. The pump is driven via an electric motor. The hydraulic pressure system is suitable for delivering a hydraulic fluid into the clutch cylinder via the pump and for moving the clutch piston, with the result that the clutch linings are brought into contact with one another counter to a force of the clutch spring. For said clutches, the method comprises at least the following steps which are to be carried out one after another:

a) providing a value for a setpoint pressure which is to prevail in the clutch cylinder;
b) filling the clutch cylinder with the hydraulic liquid in order to reach the setpoint pressure;
c) if the setpoint pressure is between 0 and 7 bar, the actual pressure in the clutch cylinder is set by way of a regulation of a rotational speed of the pump or the electric motor; and,
   if the setpoint pressure is more than 7 bar, the actual pressure in the clutch cylinder is set by way of a regulation of a motor current of the electric motor; and
d) regulating the actual pressure until the setpoint pressure is reached.

A gearwheel pump with a delivery capacity of 1 ml/revolution (milliliter per revolution) is preferably used as pump. Other pump designs are possible, such as a gerotor pump, planetary rotor pump, etc. The motor current is, in particular, up to 40 A (amperes).

A distinction is made here between two different regulating methods of the actual pressure in the clutch or in the hydraulic pressure system; at a (predefined or desired) setpoint pressure up to a maximum of 7 bar, the regulation of the actual pressure takes place only by way of the regulation of the rotational speed of the pump of the hydraulic system or by way of the regulation of the rotational speed of the electric motor. At a predefined or desired setpoint pressure of more than 7 bar, a regulation is carried out, according to which the actual pressure is regulated only with consideration of the electric motor current of the electric motor of the hydraulic system. It has been proven that, at relatively low setpoint pressures, there is a higher correlation between the setpoint pressure and the regulated actual pressure if the rotational speed of the pump/the electric motor (that is to say, the delivery quantity of the hydraulic fluid) is used as measured value.

An air gap is overcome at a grip point of the clutch, and the clutch linings are in contact with one another; a further increase in the pressure in the pressure system would directly bring about a provision of a torque capacity of the clutch.

It is proposed that a value for the setpoint pressure is provided in step a), which setpoint pressure would bring about the provision of a torque capacity of the clutch, which setpoint pressure therefore has a value, at which the grip point of the clutch has already been reached.

It is proposed (in particular, in addition to the abovementioned variant) that the clutch cylinder is filled with the hydraulic fluid in step b), the grip point of the clutch being reached and exceeded. Therefore, an actual pressure is reached in every case, at which actual pressure the grip point of the clutch is reached reliably.

The actual pressure in the clutch cylinder is set by way of a regulation of a rotational speed of the pump/the electric motor (then at the same time) in step c) if the setpoint pressure is between 1.5 and 7 bar, in particular between 2.5 and 7 bar.

A high correlation between the setpoint pressure in the actual pressure is achieved even at low setpoint pressures by way of the above embodiments of method steps a), b) and c). In this way, operation of the clutch is possible which is more comfortable and less susceptible to wear.

According to one embodiment, the pump/the electric motor is operated as follows after an ignition of the motor vehicle is switched off during a follow-up time:
i. initially at a constant rotational speed, and subsequently
ii. with a constant motor current of the electric motor,
in each case the values which occur of the further parameters of motor current and rotational speed being determined during the phases i. and ii., and said values being taken into consideration for step c). This takes place in such a way that an improved correlation between the setpoint pressure and the regulated actual pressure is achieved (by way of identification of the characteristic of the hydraulic system, for example adaptations of the pressure/current or pressure/rotational speed characteristic curve).

By way of the operation in phase i., the hydraulic leakage which is present individually for each hydraulic system can be determined at least approximately. By way of the operation in phase ii., the degree of mechanical efficiency (frictional forces, etc.) can be determined approximately. As a consequence of the incorporation of the information which is obtained in this way, the accuracy of the regulation of the actual pressure can be improved further.

Furthermore, a motor vehicle having a drive unit, a transmission and at least one clutch is proposed, the clutch having a plurality of clutch linings and a clutch spring, and being connected to a hydraulic pressure system which has at least one pump, a clutch cylinder and a clutch piston. The pump is driven by an electric motor. The hydraulic pressure system is suitable for delivering a hydraulic fluid into the clutch cylinder via the pump and for moving the clutch piston, with the result that the clutch linings are brought into contact with one another counter to a force of the clutch spring, a controller, i.e., an electronic controller or electronic control unit (ECU) being provided and set up for operating the clutch in accordance with the method which is proposed here.

Figure 2:
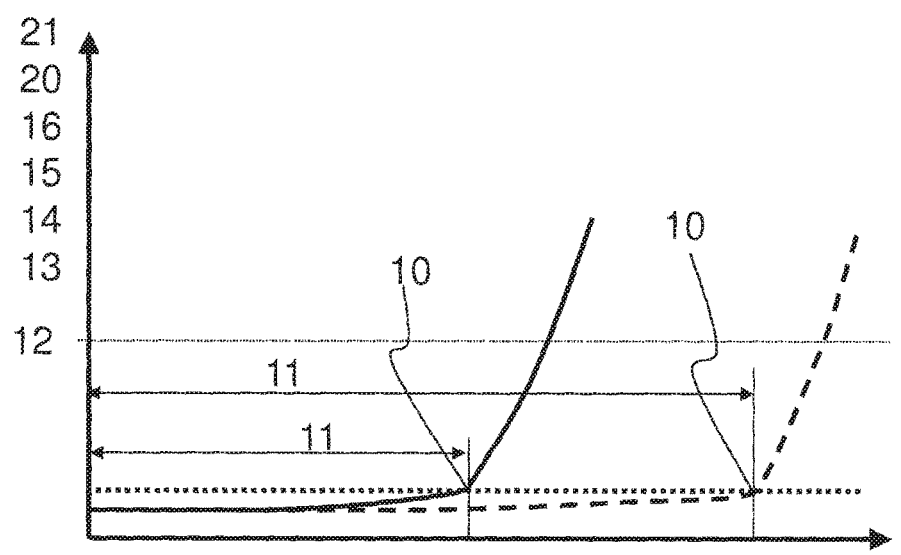
Figure 3:
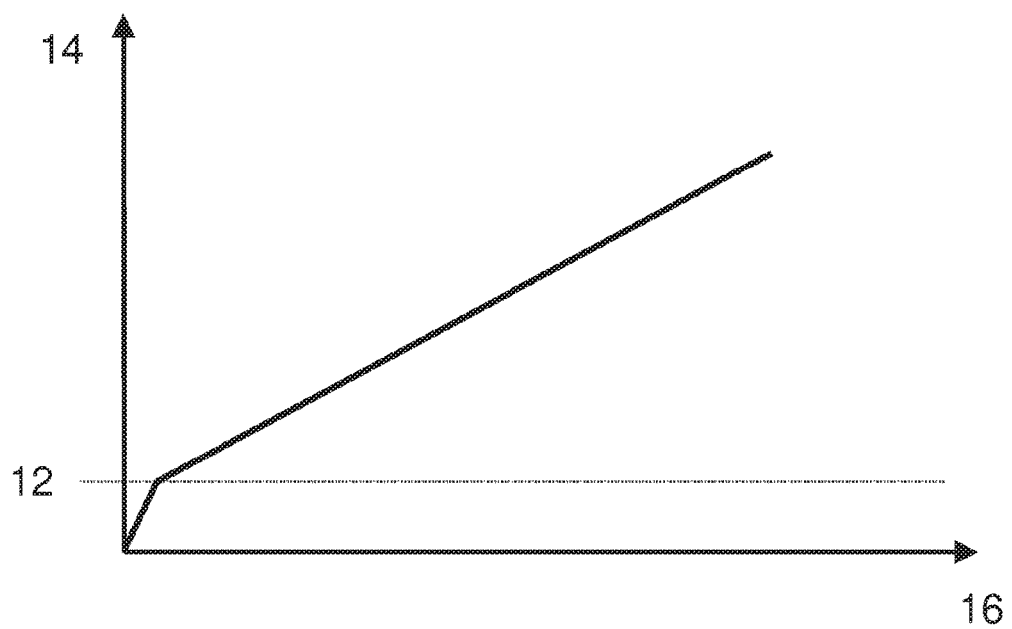

The disclosed subject matter and the technical environment will be described in greater detail in the following text using the figures. It is to be noted that the figures show example embodiments, to which they are not restricted, however. Identical designations are also used for identical objects in the figures, in which, diagrammatically:

FIG. 1 shows a motor vehicle having a clutch;
FIG. 2 shows a graph of various clutch parameters; and
FIG. 3 shows a diagram to illustrate the relationship between the actual pressure and the motor current.

FIG. 1 shows a motor vehicle 2 having a drive unit 17, a transmission 18 and (as shown here) a single clutch 1. The clutch 1 has a plurality of clutch linings 3 and a clutch spring 4, and is connected to a hydraulic pressure system 5 which has at least one pump 6, a clutch cylinder 7 and a clutch piston 8, the hydraulic pressure system 5 being suitable for delivering a hydraulic fluid 9 into the clutch cylinder 7 via the pump 6 and for moving the clutch piston 8, with the result that the clutch linings 3 are brought into contact with one another counter to a force of the clutch spring 4. When the clutch linings 3 are brought into contact with one another (see grip point 10, a torque of the drive unit 17 is transmitted to the transmission 18. The hydraulic pressure system 5 has a leakage 24.

The hydraulic pressure system 5 is connected to a controller 19. The controller 19 regulates and monitors the rotational speed 15 of the pump 6/the electric motor 25, and the motor current 16 of the electric motor 25. The required setpoint pressure 13 in the clutch 1 is set by the controller 19. Here, the rotational speed 15 of the pump 6/the electric motor 25 and/or the motor current 16 of the electric motor 25 are/is regulated in such a way that the actual pressure 14 in the clutch 1 corresponds as far as possible to the setpoint pressure 13.

FIG. 2 shows a diagram in which the profile of the parameters of the motor current 16, the torque 20 and the pressure 21 are plotted for two different clutches 1 with a different air gap 11 against the travel 22 and the volume 23. The travel 22 and a volume 23 denote the travel of the clutch piston 8 and the volume 23 of the hydraulic fluid 9 which is delivered into the clutch cylinder 7, respectively. It can be seen that the air gap 11 of the clutch 1 is overcome after a defined travel 22 or volume 23, and the clutch linings 3 are brought into contact, with the result that the grip point 10 is reached. From this point, the curve rises steeply (that is to say the values for the rotational speed 15, the motor current 16, the torque 20 and the pressure 21 or the actual pressure 14). A further increase in the pressure 21 in the pressure system 5 would then directly bring about a provision of a torque 20 of the clutch 1, that is to say the clutch 1 would transmit a torque 20 of a drive unit 17 to a transmission 18.

If a setpoint pressure 13 with a value 12 is then to be provided in the clutch 1, a distinction is made as to whether the value 12 exceeds a defined value 12. In a manner which is dependent on this, the actual pressure 14 in the clutch 1 is regulated in a different way by way of the pump 6 or by way of the electric motor 25. If the value 12 is lower than 7 bar, the actual pressure 14 in the clutch cylinder 7 is set by regulating the rotational speed 15 of the pump 6/the electric motor 25. If the value 12 is 7 bar or more, the actual pressure 14 in the clutch cylinder is set by way of a regulation of the motor current 16 of the electric motor 25.

FIG. 3 shows a diagram for illustrating the relationship between the actual pressure 14 and the motor current 16. Above a certain value 12 of the actual pressure 14 (above 7 bar here), the relationship between the actual pressure 14 and the motor current 16 is linear and has a constant profile. Accordingly, the actual pressure 14 can be set precisely by way of setting of the motor current 16.

The invention claimed is:

1. A method for regulating an actual pressure of a clutch of a motor vehicle, the clutch having a plurality of clutch linings and a clutch spring, and being connected to a hydraulic pressure system that has at least one pump driven by an electric motor, a clutch cylinder and a clutch piston, the hydraulic pressure system being arranged for delivering a hydraulic fluid into the clutch cylinder via the pump and for moving the clutch piston, so that the clutch linings are brought into contact with one another counter to a force of the clutch spring, the method comprising:
   a) providing a value for a setpoint pressure which is to prevail in the clutch cylinder;
   b) filling the clutch cylinder with the hydraulic fluid in order to reach the setpoint pressure;
   c) determining that the setpoint pressure is one of less than or equal to 7 bar and greater than 7 bar, and, based on the determined set point pressure, selecting to set an actual pressure in the clutch cylinder by one of a regulation of rotational speed of the pump or the electric motor and a regulation of a motor current of the electric motor; and
   d) regulating the actual pressure until the setpoint pressure is reached.

2. The method of claim 1, wherein an air gap is overcome at a grip point of the clutch, and the clutch linings are in contact so that a further increase in the pressure in the pressure system would directly provide torque such that the value for the setpoint pressure would bring about providing torque by the clutch, and the clutch cylinder is filled with the hydraulic fluid, with the result that the grip point of the clutch is reached and exceeded, the method further comprising, if the setpoint pressure is between 1.5 and 7 bar, setting the actual pressure in the clutch cylinder by regulating the rotational speed of the pump or the electric motor.

3. The method of claim 1, further comprising operating the pump or the electric motor as follows after an ignition of the motor vehicle is switched off during a follow-up time in phases i and ii as follows:
   i) first at a constant rotational speed, and subsequently
   ii) the electric motor being operated with a constant motor current,
   in each case the values of the further parameters which occur of motor current and rotational speed being determined during the phases i and ii, and said values being taken into consideration for determining that the setpoint pressure is one of less than or equal to 7 bar and greater than 7 bar.

4. A motor vehicle having a drive unit, a transmission and at least one clutch, the clutch having a plurality of clutch linings and a clutch spring, and being connected to a hydraulic pressure system which has at least one pump that is driven by way of an electric motor, a clutch cylinder and a clutch piston, the hydraulic pressure system being arranged for delivering a hydraulic fluid into the clutch cylinder via the pump and for moving the clutch piston, so that the clutch linings are brought into contact with one another counter to a force of the clutch spring, a controller being provided and configured for:
   a) providing a value for a setpoint pressure which is to prevail in the clutch cylinder;
   b) filling the clutch cylinder with the hydraulic fluid in order to reach the setpoint pressure;
   c) determining that the setpoint pressure is one of less than or equal to 7 bar and greater than 7 bar, and, based on the determined set point pressure, selecting to set an actual pressure in the clutch cylinder by one of a regulation of rotational speed of the pump or the electric motor and a regulation of a motor current of the electric motor; and
   d) regulating the actual pressure until the setpoint pressure is reached.

5. The motor vehicle of claim 4, wherein an air gap is overcome at a grip point of the clutch, and the clutch linings are in contact so that a further increase in the pressure in the pressure system would directly provide torque such that the value for the setpoint pressure would bring about providing torque by the clutch, and the clutch cylinder is filled with the hydraulic fluid, with the result that the grip point of the clutch is reached and exceeded, the controller further configured for, if the setpoint pressure is between 1.5 and 7 bar, setting the actual pressure in the clutch cylinder by regulating the rotational speed of the pump or the electric motor.

6. The motor vehicle of claim 1, the controller further configured for operating the pump or the electric motor as follows after an ignition of the motor vehicle is switched off during a follow-up time in phases i and ii as follows:
   i) first at a constant rotational speed, and subsequently
   ii) the electric motor being operated with a constant motor current,
   in each case the values of the further parameters which occur of motor current and rotational speed being determined during the phases i and ii, and said values being taken into consideration for determining that the setpoint pressure is one of less than or equal to 7 bar and greater than 7 bar.

* * * * *